C. S. VADNER.
PROCESS FOR ARRESTING SULFUROUS GASES AND FUMES AND UTILIZING THE HEAT AND GASES CONTAINED THEREIN.
APPLICATION FILED OCT. 29, 1913.

1,110,660. Patented Sept. 15, 1914.

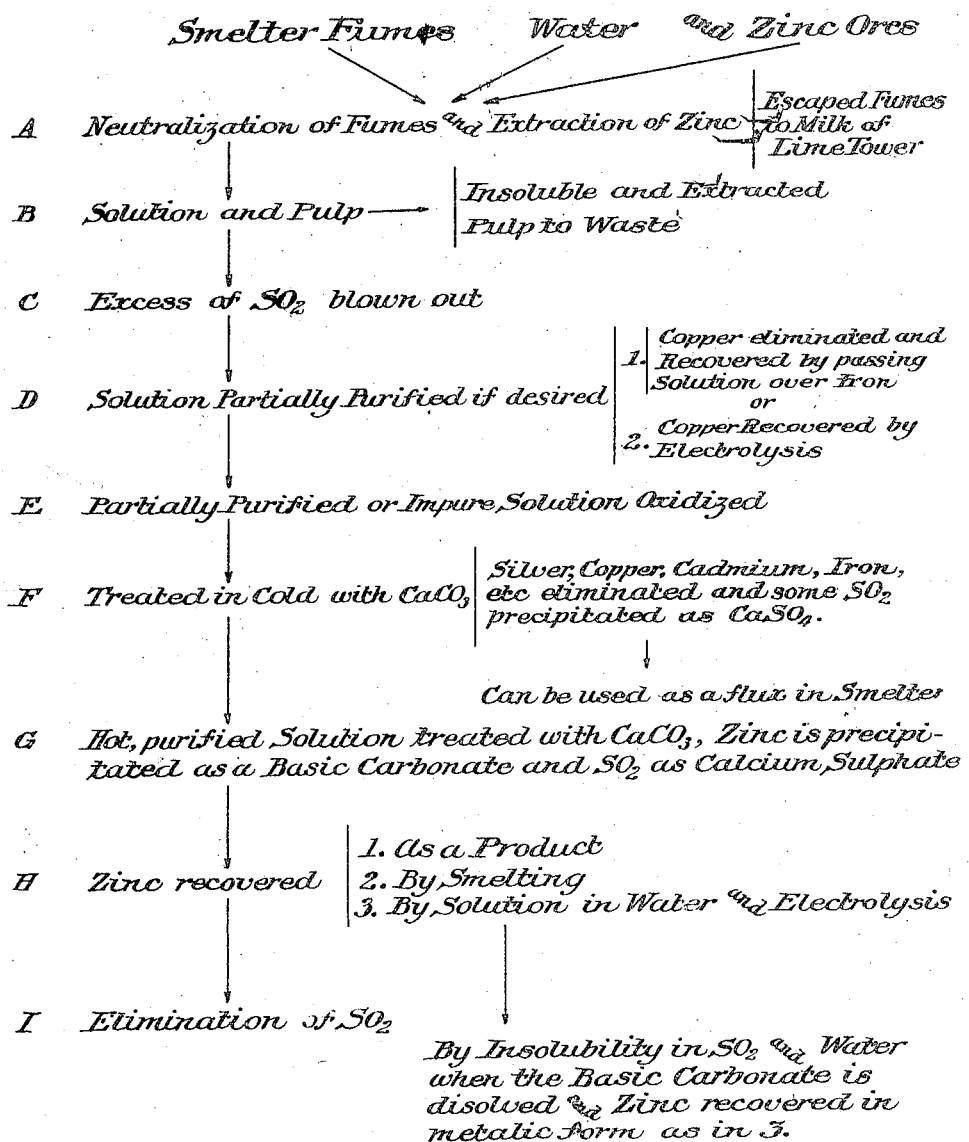

Smelter Fumes    Water    and Zinc Ores

A    Neutralization of Fumes and Extraction of Zinc — Escaped Fumes to Milk of Lime Tower B    Solution and Pulp — Insoluble and Extracted Pulp to Waste C    Excess of $SO_2$ blown out D    Solution Partially Purified if desired
1. Copper eliminated and Recovered by passing Solution over Iron
or
2. Copper Recovered by Electrolysis E    Partially Purified or Impure Solution Oxidized F    Treated in Cold with $CaCO_3$ — Silver, Copper, Cadmium, Iron, etc eliminated and some $SO_2$ precipitated as $CaSO_4$.

Can be used as a flux in Smelter

G    Hot, purified Solution treated with $CaCO_3$, Zinc is precipitated as a Basic Carbonate and $SO_2$ as Calcium Sulphate H    Zinc recovered
1. As a Product
2. By Smelting
3. By Solution in Water and Electrolysis I    Elimination of $SO_2$ By Insolubility in $SO_2$ and Water when the Basic Carbonate is disolved and Zinc recovered in metalic form as in 3.

Witnesses:
F. C. Walker.
C. Hansen.

Inventor:
Charles S. Vadner
by Frank B. Scott
Atty.

UNITED STATES PATENT OFFICE.

CHARLES S. VADNER, OF SALT LAKE CITY, UTAH.

PROCESS FOR ARRESTING SULFUROUS GASES AND FUMES AND UTILIZING THE HEAT AND GASES CONTAINED THEREIN.

1,110,660.

Specification of Letters Patent.   Patented Sept. 15, 1914.

No Drawing.   Application filed October 29, 1913. Serial No. 797,949.

*To all whom it may concern:*

Be it known that I, CHARLES S. VADNER, a citizen of the United States, and a resident of Salt Lake City, Salt Lake county, Utah, have invented a new and useful Process for Arresting Sulfurous Gases and Fumes and Utilizing Heat and Gases Contained Therein.

It is well known that in various smelting operations, in roasting ores and in various other operations that produce sulfurous gases that a large amount of obnoxious fumes are emitted into the air and that these fumes and gases are a source of annoyance and injury to animal and vegetable life. While the mechanical impurities contained in these fumes can be fairly well arrested by the baghouse system and by the use of long flues and baffles, the sulfurous fumes and gases are but partially arrested or rendered innocuous by them.

The object of my invention then is to utilize these sulfurous fumes and the contained heat and to render them harmless to all forms of life.

Another object of my invention is to provide an effective and inexpensive method of recovering zinc from ores containing it.

To accomplish these objects I make use of the heat and sulfurous gases contained in fumes, subjecting oxids, carbonates and sufficiently roasted ores containing copper, iron, zinc, lead, arsenic, antimony, cadmium lime and bismuth, in the presence of a sufficient quantity of water, to the action of these sulfurous gases. By this means these metals are extracted and recovered from the ores and the fumes arrested and rendered harmless.

It will be understood that if desirable in cases where smelter fumes are not available, sulfur can be burnt in order to provide the necessary sulfurous gases for the reduction of ore.

Oxids, carbonates or sufficiently roasted ores are ground to the proper size and showered or sprayed in water down through the first of a series of purification towers. These towers are of suitable size and height according to the quantity of ore to be treated and the length of time the ore requires to be exposed. The sulfurous fumes are led into these purification towers and mingled with the sprayed ore pulp. By means of this spraying, every particle of ore is subjected to the action of the sulfurous gases, which, in the presence of water, effects the solution of the copper and zinc, some of the iron and arsenic and other metals contained as aforesaid in the ore. This solution falls to the sump at the bottom of the tower while the unused gases pass on to the next tower. These towers are interposed between the points in the flues where the sulfurous gases are all united and the point from which they are finally voided. The sulfurous fumes are drawn either by natural or artificial draft from the main flue in the base of the first purification tower and by a suitable flue led down into the base of a second tower, thence up through the tower and down again to the base of the third tower and so on throughout the series of towers and finally out of the stack. In each tower the fumes come in contact with the sprayed ore pulp so that the sulfurous gases may have a chance to unite with the metals, and fall to the sump at the bottom. As many towers can be interposed in the path of the sulfurous fumes as may be found necessary in order to expose sufficient ore requisitely long to take from the fumes all the sulfurous gases and render them harmless enough to be voided into the air. Where the smelter stack is built on an elevation with the flues leading thereto and with towers interposed in succession in the path of the flues, the sprayed ore pulp can be fed again to the successive towers by gravity, otherwise it can be drawn up by pumps. As a precaution against voiding fumes containing appreciable amounts of sulfurous gases an absorption tower containing boulders of lime rock over which trickles a solution of milk of lime is interposed between the last purification tower and the stack through which the fumes are finally voided into the atmosphere. The solution of milk of lime is returned to the top of the absorption tower by any suitable means as long as it is found efficient in neutralizing the traces of sulfurous acid that may escape from the last purification tower. The resultant calcium sulfite on exposure to the air is quickly oxidized to calcium sulfate which can be dried or dried and calcined and used in the arts. The purification towers are built over sumps into which the solution of ore and dissolved sulfurous vapors and undissolved ore falls. If the settled and undissolved portion of the ore is found to contain sufficient values it is removed from the sump and sent to the smelter, where on account of the lead, iron, gold, and silver it is very desirable. If the solution is found to contain copper, it is now passed in any suitable manner over metallic iron and the copper in the solution is precipitated and settles to the bottom, when it may be withdrawn and purified and so become a marketable product. Air under pressure is forced through the solution in this tank and the excess of sulfurous gas is thereby blown out of the solution. When the ore coming from the solution has only a faint odor, or none at all of sulfurous gas, further air treatment is stopped. If the solution is found to contain copper it is now passed in any suitable manner over metallic iron. The iron displaces copper in the solution and the copper settles to the bottom whence it may be withdrawn and purified and so become a marketable product. Instead of the use of the metallic iron the sealed cover may be removed and the copper recovered by any suitable electrolytic method. After the copper is removed the solution is then oxidized with oxygen, chlorin gas or any other suitable oxidizing agent until all of the iron contained in the solution is in the ferric condition. The oxidized solution is now cooled and treated in the cold. Finely ground calcium carbonate is now added to the solution until further addition of the same causes no effervescence. By this means the whole of the iron is precipitated as ferric hydrate which will react with any arsenic present to precipitate the same along with any copper, cadmium and bismuth that may have escaped previous precipitation. The solution is now allowed to settle and the sediment drawn off, washed and filter pressed and if found to be of any use for its iron contents is sent to the smelter, or worked up if desired, for its arsenic contents, or if valueless thrown away. The clear solution is now treated with live steam and finely ground calcium carbonate until the solution becomes neutral and the zinc in the course of two to four hours treatment is all precipitated in the form of carbonates together with some lime. The solution is settled and decanted. The precipitate is washed and decanted and drawn off on to a draining floor and dried, when the zinc can be recovered by any suitable smelting method. By effecting a solution of said carbonate of zinc by exposing same to the action of sulfurous gases in any of the purification towers, the precipitated carbonate of zinc may be dissolved and the solution drawn off in to any suitable treatment tank and the excess of sulfurous gases blown out by air. The solution may be then electrolyzed by any suitable means and the zinc recovered as metallic zinc.

Having described my process what I claim is new, and wish to secure by Letters Patent is:—

1. The process of recovering zinc and other metals from naturally oxidized and sufficiently roasted sulfid ores containing zinc and other metals which consists in spraying the finely ground pulp of said ores into sulfurous gases, eliminating the copper contained therein by passing the solution over iron, oxidizing the solution, treating same in the cold with finely pulverized calcium carbonate, whereby the ferric hydrate reacts with arsenic and eliminates same from the solution as ferric arsenite, reheating the solution and precipitating the zinc as a basic carbonate by means of additional finely pulverized calcium carbonate.

2. The process which consists in recovering zinc and other metals from naturally oxidized or sufficiently roasted sulfid ores containing zinc and other metals by spraying the finely ground pulp of said ores into smelter fumes containing sulfurous gases, eliminating the copper contained therein by passing the solution over metallic iron, oxidizing and treating the solution in the cold with finely pulverized calcium carbonate whereby the ferric hydrate formed reacts with the arsenic and eliminates same from the solution as ferric arsenite.

3. The process which consists in recovering zinc and other metals from naturally oxidized or sufficiently roasted sulfid ores containing zinc and other metals by spraying the finely ground pulp of said ores into smelter fumes containing sulfurous gases, eliminating the copper contained therein by passing the solution over metallic iron, oxidizing the solution and eliminating the other metals except zinc by precipitating same in the cold by means of a sufficient quantity of finely pulverized calcium carbonate, reheating the solution and precipitating the zinc as a basic carbonate by means of additional finely pulverized calcium carbonate.

4. The process which consists in recovering zinc and other metals from naturally oxidized or sufficiently roasted sulfid ores containing zinc and other metals except zinc by spraying the finely ground pulp of said ores into smelter fumes containing sulfurous gases, eliminating the copper therein by passing the solution over metallic iron, oxidizing the solution and eliminating the other metals by precipitating same in the cold by means of a sufficient quantity of finely pulverized calcium carbonate and reheating the solution and precipitating the zinc as a basic carbonate by means of finely pulverized calcium carbonate, and dissolving the basic zinc carbonate in sulfur dioxid and water and electrolyzing the solution whereby the zinc is recovered in metallic form.

5. The process which consists in recovering zinc and other metals from naturally oxidized or sufficiently roasted sulfid ores containing zinc and other metals by spraying the finely ground pulp of said ores into smelter fumes containing sulfurous gases, oxidizing the solution and ridding the solution of the other metals contained therein by precipitating the same in the cold by means of a sufficient quantity of finely pulverized calcium carbonate.

6. The process which consists in recovering zinc and other metals from naturally oxidized or sufficiently roasted sulfid ores containing zinc and other metals by spraying the finely ground pulp of said ores into smelter fumes containing sulfurous gases, oxidizing the solution, and ridding the solution of the other metals contained therein except the zinc by precipitating the same in the cold by means of a sufficient quantity of finely pulverized calcium carbonate, heating the solution and precipitating the zinc as a basic carbonate by precipitating the same from the hot solution by means of finely pulverized calcium carbonate.

7. The process which consists in recovering zinc and other metals from naturally oxidized or sufficiently roasted sulfid ores containing zinc and other metals by spraying the finely ground pulp of said ores into smelter fumes containing sulfurous gases, oxidizing the solution, and ridding the solution of the other metals contained therein except the zinc by precipitating the same in the cold by means of a sufficient quantity of finely pulverized calcium carbonate, reheating the solution and precipitating the zinc as a basic carbonate from the hot solution by means of finely pulverized calcium carbonate and dissolving the basic carbonate in sulfur dioxid and water and electrolyzing the solution whereby the zinc is recovered in metallic form.

8. The process of recovering zinc and other metals from naturally oxidized and sufficiently roasted sulfid ores containing zinc and other metals which consists in spraying the finely ground pulp of said ores into sulfurous gases, eliminating the copper contained therein by passing the solution over iron, oxidizing the solution, treating same in the cold with finely pulverized calcium carbonate, whereby the ferric hydrate reacts with arsenic and eliminates same from the solution as ferric arsenite, reheating the solution and precipitating the zinc as a basic carbonate by means of additional finely pulverized calcium carbonate, dissolving the zinc carbonate in sulfur dioxid and water and electrolyzing the solution whereby the zinc is recovered.

9. The process of recovering zinc and other metals from naturally oxidized and sufficiently roasted sulfid ores containing zinc and other metals which consists in spraying the finely ground pulp of said ores into sulfurous gases, oxidizing the solution, treating same in the cold with finely pulverized calcium carbonate, whereby the ferric hydrate reacts with arsenic and eliminates same from the solution as ferric arsenite, reheating the solution and precipitating the zinc as a basic carbonate by means of additional finely-pulverized calcium carbonate.

10. The process of recovering zinc and other metals from naturally oxidized and sufficiently roasted sulfid ores containing zinc and other metals which consists in spraying the finely ground pulp of said ores into sulfurous gases, oxidizing the solution, treating same in the cold with finely pulverized calcium carbonate, whereby the ferric hydrate reacts with arsenic and eliminates same from the solution as ferric arsenite, reheating the solution and precipitating the zinc as a basic carbonate by means of additional finely precipitated calcium carbonate, reheating the solution, precipitating the zinc as a basic carbonate by means of additional finely pulverized calcium carbonate, dissolving the zinc carbonate in sulfur dioxid and water and electrolyzing the solution, whereby the zinc is recovered.

In witness whereof I have hereunto set my hand in the presence of two subscribing witnesses.

CHARLES S. VADNER.

Witnesses:
 MARIUS J. JACOBSEN,
 EVVA OSBORN.